US012661615B2

(12) United States Patent
Southwell et al.

(10) Patent No.: US 12,661,615 B2
(45) Date of Patent: Jun. 23, 2026

(54) USE OF MELAMINE CYANURATE NANOPARTICLES AND SILICA NANOPARTICLES FOR H2S SCAVENGING

(71) Applicant: NISSAN CHEMICAL AMERICA CORPORATION, Houston, TX (US)

(72) Inventors: John Edmond Southwell, Glen Ellyn, IL (US); Samuel James Maguire-Boyle, Spring, TX (US)

(73) Assignee: Nissan Chemical America Corporation, Houston, TX (US)

( * ) Notice: Subject to any disclaimer, the term of this patent is extended or adjusted under 35 U.S.C. 154(b) by 496 days.

(21) Appl. No.: 18/546,759

(22) PCT Filed: Feb. 18, 2022

(86) PCT No.: PCT/US2022/016954
§ 371 (c)(1),
(2) Date: Aug. 16, 2023

(87) PCT Pub. No.: WO2022/178237
PCT Pub. Date: Aug. 25, 2022

(65) Prior Publication Data
US 2024/0207783 A1     Jun. 27, 2024

Related U.S. Application Data

(60) Provisional application No. 63/151,215, filed on Feb. 19, 2021.

(51) Int. Cl.
B01D 53/52     (2006.01)
B01D 53/78     (2006.01)
C10G 17/09     (2006.01)

(52) U.S. Cl.
CPC ............. B01D 53/52 (2013.01); B01D 53/78 (2013.01); C10G 17/09 (2013.01); *B01D 2252/20436* (2013.01); *B01D 2253/106* (2013.01); *B01D 2257/304* (2013.01); *C10G 2300/207* (2013.01)

(58) Field of Classification Search
None
See application file for complete search history.

(56) References Cited

U.S. PATENT DOCUMENTS

| | | | |
|---|---|---|---|
| 1,991,765 | A | 2/1935 | Marks |
| 2,606,873 | A | 8/1952 | Cardwell et al. |
| 3,514,410 | A | 5/1970 | Engle et al. |
| 3,585,069 | A | 6/1971 | Owsley |
| 3,669,613 | A | 6/1972 | Knox et al. |
| 4,220,500 | A | 9/1980 | Baba et al. |
| 4,289,639 | A | 9/1981 | Buske |
| 4,310,435 | A | 1/1982 | Frenier |
| 4,680,127 | A | 7/1987 | Edmondson |
| 4,808,765 | A | 2/1989 | Pearce et al. |

| | | | |
|---|---|---|---|
| 4,978,512 | A | 12/1990 | Dillon et al. |
| 5,085,842 | A | 2/1992 | Porz et al. |
| 5,208,369 | A | 5/1993 | Crump et al. |
| 5,980,845 | A | 11/1999 | Cherry |
| 7,141,518 | B2 | 11/2006 | Macdonald et al. |
| 7,438,875 | B2 | 10/2008 | Do et al. |
| 7,985,881 | B2 | 7/2011 | Westlund et al. |
| 9,006,508 | B2 | 4/2015 | Kanazirev et al. |
| 9,463,989 | B2 | 10/2016 | Menendez et al. |
| 11,059,079 | B1 | 7/2021 | Allred, Jr. |
| 11,077,474 | B1 | 8/2021 | Allred, Jr. |
| 11,512,241 | B2 | 11/2022 | Allred, Jr. |
| 11,732,181 | B2 | 8/2023 | Allred, Jr. |
| 12,275,891 | B2 | 4/2025 | Allred, Jr. |
| 2005/0084438 | A1 | 4/2005 | Do et al. |
| 2005/0085144 | A1 | 4/2005 | Macdonald et al. |
| 2009/0065445 | A1 | 3/2009 | Westlund et al. |
| 2011/0000854 | A1 | 1/2011 | Nichols et al. |
| 2013/0004393 | A1 | 1/2013 | Menendez et al. |
| 2013/0204065 | A1 | 8/2013 | Kanazirev et al. |
| 2014/0155669 | A1 | 6/2014 | Slowing et al. |
| 2016/0237335 | A1 | 8/2016 | Salla et al. |
| 2018/0044598 | A1 | 2/2018 | Tan |
| 2018/0291284 | A1 | 10/2018 | Sommese et al. |
| 2018/0345212 | A1 | 12/2018 | Legaspi Felipe et al. |
| 2021/0322920 | A1 | 10/2021 | Sahoo et al. |
| 2025/0243399 | A1 | 7/2025 | Allred, Jr. |

FOREIGN PATENT DOCUMENTS

| | | | |
|---|---|---|---|
| CA | 2769060 | A1 | 8/2013 |
| CN | 101591555 | B | 7/2012 |
| CN | 102585952 | A | 7/2012 |
| CN | 106795752 | B | 8/2020 |
| EP | 3566762 | A2 | 11/2019 |
| WO | 9408980 | A1 | 4/1994 |

(Continued)

OTHER PUBLICATIONS

Amit Singh et al., Copper Coated Silica Nanoparticles for Odor Removal, Sep. 26, 2010, 26(20), American Chemical Society, pp. 15837-15844.

Faeze Tari et al., Modified and Systematic Synthesis of Zinc Oxidesilica Composite Nanoparticles With Optimum Surface Area as a Proper H2S Sorbent, Apr. 1, 2017, vol. 95, No. 4, Canadian Journal of Chemical Engineering, 7 pages.

Jan M. Bakke, et al. Hydrolysis of 1,3,5-Tris(2-hydroxyethyl)hexahydro-s-triazine and Its Reaction with H2S, Ind. Eng. Chem. Res., vol. 40, 2001, 3 pages.

Hydrogen Sulfide Scavenger (H2S Scavenger), Corrosionpedia, Last updated: Jul. 19, 2024, Retrieved from the Internet URL:https://www.corrosionpedia.com/definition/1645/hydrogen-sulfide-scavenger-h2s-scavenger.

L. Chu et al., Glycidoxypropyltrimethoxysilane Modified Colloidal Silica Coatings, MRS Proceedings, Jan. 1, 1996, 5 pages, vol. 435, XP055524536.

(Continued)

*Primary Examiner* — Daniel Berns
(74) *Attorney, Agent, or Firm* — Nixon & Vanderhye, PC

(57) ABSTRACT

A process to remove $H_2S$ from a stream comprising the steps of adding Melamine cyanurate, optionally a silica nanoparticle composition, and optionally a triazine. The stream is selected from the group consisting of Oil streams, Gas streams, $CO_2$ point source purification streams and Geothermal Energy System streams.

1 Claim, No Drawings

(56)          References Cited

FOREIGN PATENT DOCUMENTS

| | | | |
|---|---|---|---|
| WO | 2016019101 | A1 | 2/2016 |
| WO | 2018009497 | A1 | 1/2018 |
| WO | 2020039199 | A1 | 2/2020 |
| WO | 2022178251 | A1 | 8/2022 |
| WO | 2022178286 | A1 | 8/2022 |

OTHER PUBLICATIONS

L. Hoven et al., Odour Management Guidance for Refineries, Jan. 1, 2020, pp. 1-93, XP055851362.

Michael Gonser, et al., Simultaneous Control of Subsurface Scale, Corrosion, and H2S Using a Single Capillary String: A Real-World Chemical Application in the Permian Basin, 2022 SPE Annual Technical Conference and Exhibition, Oct. 5, 2022, 20 pages.

Mohamed Chehimi et al., Surface chemical and thermodynamic properties of [gamma]-glycidoxy-propyltrimethoxysilane-treated alumina: an XPS and IGC study, Journal of Materials Chemistry, Jan. 1, 2001, pp. 533-543, vol. 11, No. 2.

Zeina Abbas et al., Evaluation of CO2 Purification Requirements and the Selection of Processes for Impurities Deep Removal from the CO2 Product Stream, Energy Procedia, 2013, pp. 2389-2396, vol. 37.

Schaack and Chan, $H_2S$ Scavenging: Caustic-based process remains attractive, Oil & Gas Journal, vol. 87, No. 5, pp. 81-82, Jan. 1989.

Schaack and Chan, $H_2S$ Scavenging: Cost estimating depends on location material, Oil & Gas Journal, vol. 87, No. 9, pp. 90-91, Feb. 1989.

Schaack and Chan, $H_2S$ Scavenging: Formaldehyde-methanol, metallic-oxide agents head scavengers list, Oil & Gas Journal, vol. 87, No. 4, pp. 51-55, Jan. 1989.

Schaack and Chan, $H_2S$ Scavenging: Process design guidelines vary widely, Oil & Gas Journal, vol. 87, No. 8, pp. 45-48, Feb. 1989.

International Search Report for PCT/US2022/016954 mailed May 3, 2022, 5 pages.

Written Opinion of the ISA for PPCT/US2022/016954 mailed May 3, 2022, 5 pages.

U.S. Appl. No. 18/546,674, filed Aug. 16, 2023, Southwell et al.

U.S. Appl. No. 18/546,662, filed Aug. 16, 2023, Coady et al.

U.S. Appl. No. 18/546,664, filed Aug. 16, 2023, Maguire-Boyle et al.

U.S. Appl. No. 18/546,755, filed Aug. 16, 2023, Maguire-Boyle et al.

Portela et al., "Spectroscopic evaluation of commercial H2S scavengers", Fuel 216 (2018) 681-685.

USE OF MELAMINE CYANURATE NANOPARTICLES AND SILICA NANOPARTICLES FOR H2S SCAVENGING

CROSS-REFERENCE TO RELATED APPLICATIONS

This application is the U.S. national phase of International Application No. PCT/US2022/016954 filed which designated the U.S. and claims priority to U.S. 63/151,215 filed Feb. 19, 2021, the entire contents of each of which are hereby incorporated by reference.

FIELD OF THE INVENTION

This invention is in the field of chemicals used to remove hydrogen sulfide ($H_2S$) from Oil streams, Gas streams, $CO_2$ point source purification and Geothermal Energy Systems.

BACKGROUND OF THE INVENTION

Hydrogen sulfide is present in natural gas from many gas fields. It can also be present in Oil streams, Gas streams, $CO_2$ point source purification and Geothermal Energy Systems.

It is a highly undesirable constituent because it is toxic and corrosive and has a very foul odor. Therefore, several methods for its removal have been developed.

One such method is the injection of an aqueous solution of 1,3,5-tris(2-hydroxyethyl)hexahydro-s-triazine into the gas stream. Triazine is a liquid scavenger so the process is economical up to approximately 50 kg of $H_2S$/day and will remove $H_2S$ down to ca. 5 ppm in streams with relatively low concentrations of $H_2S$. However, because the products and the details of the reaction are not known, the optimal conditions for the $H_2S$ removal cannot always be applied. "Hydrolysis of 1,3,5-Tris(2-hydroxyethyl)hexahydro-s-triazine and Its Reaction with H2S, Ind. Eng. Chem. Res. 2001, 40, 6051-6054, page 6051. See www.corrosionpedia.com/definition/1645/hydrogen-sulfide-scavenger-h2s-scavenger.

A hydrogen sulfide ($H_2S$) scavenger is a specialized chemical or fuel additive widely used in hydrocarbon and chemical processing facilities. These specialized chemicals react selectively with and remove $H_2S$ to help meet product and process specifications.

Products treated for $H_2S$ include crude oil, fuels, and other refined petroleum products in storage tanks, tanker ships, railcars, and pipelines.

Hydrogen sulfide can cause damage to pipework, either by reacting directly with steel to create an iron sulfide corrosion film, or by increasing the acidity of the liquid/gas mixture in the pipes. When dissolved in water, $H_2S$ may be oxidized to form elemental sulfur. This can also produce an iron sulfide corrosion film when in direct contact with the metal surface. Therefore, it is essential to remove $H_2S$ from crude oil as quickly and efficiently as possible.

Triazine, the most commonly used liquid $H_2S$ scavenger, is a heterocyclic structure similar to cyclohexane, but with three carbon atoms replaced by nitrogen atoms. Oilfield terminology of triazine differs from the IUPAC convention, triazinane.

Three variations of triazine exist, based on the location of the substitution of nitrogen atoms, are 1,2,3-triazine; 1,2,4-triazine and 1,3,5-triazine (aka s-triazine).

Further variations involving substitutions of the hydrogen atoms with other functional groups are used in various industries. The substitutions occurring at any number of the "R" locations, 1,2,3,4,5, or 6. Different substitutions result in different reactivity with H2S, changes in solubility of triazine, and changes in the solubility of the reactant products (the "R" groups). Consequently, triazine can be "tailored" to better suit the application or disposal considerations.

Direct Injection

In direct-injection applications, the triazine is sprayed directly into the gas or mixed fluid stream, usually with an atomizing quill. Removal rate is dependent upon the H2S dissolution into the triazine solution, rather than the reaction rate. As a result, gas flow rate, contact time, and misting size & distribution contribute to the final scavenger performance. This method is excellent for removing H2S when there is good annular-mist flow and sufficient time to react. Most suppliers recommend a minimum of 15-20 seconds of contact time with the product for best results. Typical efficiencies are lower due to the H2S dissolution into the product, but ~40% removal efficiency can reasonably be expected. In order for direct injection to be effective, careful consideration of injection location and product selection must be used.

In a contactor tower, the feed gas is bubbled through a tower filled with triazine. As the gas bubbles up through the liquid, gas dissolves into the triazine and H2S is removed. The limiting factors in this application are the surface area of the bubble, the concentration of the solution, and bubble path time (contact time). Finer bubbles give a better reaction rate, but they can produce unwanted foaming. This application is not appropriate for high gas flow rates. Contactor towers have much greater H2S removal efficiencies, up to 80%. As a result, far less chemical is used and a significant reduction in operating expenditures ("OPEX") can be realized. However, the contactor tower and chemical storage take up significant space and weight, making them less practical for offshore application.

One mole of triazine reacts with two moles of H2S to form dithiazine, the main byproduct. An intermediate product is formed, but rarely seen. The R-groups that are released during the two-step reaction vary by the supplier and can be tailored for solubility. Continued reaction can result in the formation of an insoluble trithiane product.

Reacted triazine byproducts are readily biodegradable and relatively non-toxic. Unreacted, excess triazine has extremely high aquatic toxicity and a tendency to form carbonate scale with produced water or sea water; this can result in emulsion stabilization and increased overboard oil-in-water (OIW) content.

Unreacted triazine is also problematic for refineries as it impacts the desalting process and can cause accelerated corrosion within crude oil distillation units. It can also cause foaming in glycol and amine units and cause discoloration of glycol units. Unpleasant odor has also been reported with excess triazine usage, but some suppliers offer low-odor versions. Triazine itself is relatively safe to handle, but it can cause chemical burns upon contact.

Triazine and derivatives have been used successfully around the globe by many operators and facilities. It has been used in various other applications where control of low-concentration H2S is vital, including scale remediation and reservoir stimulation. It is commonly used with sour shale gas production in the US.

Triazine and derivatives are primarily used for removing low (<100 ppmv/mmscf) levels of H2S. These can be applied using a contact tower to increase (up to twice) the efficiency of H2S removal, but H2S levels >200 ppmv/mmscf will require the use of an amine-based sweetening unit. Triazine is also preferred in situations where the acid gas stream contains high levels of CO2 in addition to H2S. The triazine reacts preferentially with the H2S and the reaction is not inhibited by the CO2, avoiding unnecessary chemical consumption. It is also preferred where a concentrated sour waste gas streams cannot be accommodated or disposed.

US 2018/291284 A1 "Microparticles For Capturing Mercaptans" published on Oct. 11, 2018, and is assigned to Ecolab. This now abandoned patent application describes and claims scavenging and antifouling nanoparticle compositions useful in applications relating to the production, transportation, storage, and separation of crude oil and natural gas, as well as oral hygiene. Also disclosed are methods of making the nanoparticle compositions as scavengers and antifoulants, particularly in applications relating to the production, transportation, storage, and separation of crude oil and natural gas, as well as oral hygiene.

U.S. Pat. No. 5,208,369, "Degradable Chelants Having Sulfonate Groups, Uses and Compositions Thereof" issued on May 4, 1993. This now expired US patent describes and claims new compounds represented by Formula I: and salts and complexes thereof; wherein R is an alkyl group having at least one —SO₃H and at least one —OH; each R' is independently selected from hydrogen, an unsubstituted or inertly substituted alkyl group, an alkyl group substituted with a carbonyl group, with a carboxylic acid, salt or complexed carboxyl group, or an alkoxy group; R" is hydroxyalkyl and x+y+z=3 and are good chelants. The compounds are also biodegradable and are particularly useful in washing compositions, preferably containing detergents and in gas conditioning.

US 2011/000854, "Use of a Dual Polymer System for Enhanced Water Recovery and Improved Separation of Suspended Solids and Other Substances from an Aqueous Media" published on Jan. 6, 2011. This published patent application describes and claims a method using anionic and cationic polymers added in, any order or simultaneously, to aqueous media for the removal of substances. The sequential addition of the two biopolymers, anionic xanthan, followed by cationic chitosan, causes the rapid formation of very large and cohesive fibrillar aggregates that may exhibit high solids to liquid ratios and that quickly settle out from the aqueous media. The aqueous media can be easily separated from the large fibrillar aggregates by settling under gravity or by filtration through a porous containment device, such as a synthetic or non-synthetic woven or non-woven fabric including a geotextile fabric or a solid containment device containing a solid mesh screen.

U.S. Pat. No. 5,980,845 "Regeneration of Hydrogen Sulfide Scavengers", issued on Nov. 9, 1999. This now expired US patent describes and claims sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

SUMMARY OF THE INVENTION

The first aspect of the instant claimed invention is a process to remove H₂S from a stream comprising the steps of Adding a fluid comprising
    (i) A Melamine cyanurate,
    (ii) a silica nanoparticle composition, and
    (iii) a triazine,
wherein the stream is selected from the group consisting of Oil streams, Gas streams, CO₂ point source purification streams and Geothermal Energy System streams.

Melamine cyanurate, also known as melamine-cyanuric acid adduct or melamine-cyanuric acid complex, is a crystalline complex formed from a 1:1 mixture of melamine and cyanuric acid. The substance is not a salt despite its non-systematic name melamine cyanurate. The complex is held together by an extensive two-dimensional network of hydrogen bonds between the two compounds, reminiscent of the guanine-cytosine base pairs found in DNA. One known utility for melamine cyanurate is as a halogen-free flame retardant that can be used in thermoplastic urethanes (TPUs) for electrical wire coatings. Melamine cyanurate is available commercially from Nissan Chemical America Corporation. (See Melamine Cyanurate—Nissan Chemical America Corporation (nissanchem-usa.com))

The amount of melamine cyanurate used per unit of H2S is as follows:

In an embodiment, 1 unit of melamine cyanurate per 3 units of H2S, in another embodiment, 1 unit of melamine cyanurate per 5 units of H2S and in another embodiment, 1 unit of melamine cyanurate per 10 units of H2S.

For purposes of this patent application, silica nanoparticles include silica nanoparticles, alumina nanoparticles and silica-alumina nanoparticles.

The silica nanoparticles are sourced from all forms of precipitated SiO₂
    a) dry silica;
    b) fumed silica;
    c) colloidal silica;
    d) surface treated silicas including silicas reacted with organosilanes;
    e) metal or metal-oxide with silica combinations; and
    f) precipitated silica.

There are known ways to modify the surface of colloidal silica:
    1. Covalent attachment of Inorganic oxides other than silica.
    2. Non-covalent attachment of small molecule, oligomeric, or polymeric organic materials (PEG treatment, amines or polyamines, sulfides, etc.).
    3. Covalent attachment of organic molecule including oligomeric and polymeric species:
        a. Reaction with organosilanes/titanates/zirconates/germinates.
        b. Formation of organosilanes/titanate/zirconate/germinate oligomers followed by reaction of these with surface of colloidal silica.
        c. Silanization followed by post-reaction formation of oligomeric/dendritic/hyperbranched/polymeric species starting from colloidal silica surface.
        d. Formation of oligomeric/dendritic/hyperbranched/ polymeric silanes/zirconates/titanates followed by reaction to SiO₂ surface.

The silica particles included in the colloidal silica may have any suitable average diameter. As used herein, the average diameter of silica particles refers to the average largest cross-sectional dimension of the silica particle. In an embodiment, the silica particles may have an average diameter of between about 0.1 nm and about 100 nm. In an embodiment, the silica particles may have an average diameter of between about 1 nm and about 100 nm. In an embodiment, the silica particles may have an average diameter of between about 5 nm and about 100 nm. In an embodiment, the silica particles may have an average diameter of between about 1 nm and about 50 nm. In an embodiment, the silica particles may have an average diameter of between about 5 nm and about 50 nm. In an embodiment, the silica particles may have an average diameter of between about 1 nm and about 40 nm. In an embodiment, the silica particles may have an average diameter of between about 5 nm and about 40 nm. In an embodiment, the silica particles may have an average diameter of between about 1 nm and about 30 nm. In an embodiment, the silica particles may have an average diameter of between about 5 nm and about 30 nm. In an embodiment, the silica particles may have an average diameter of between about 7 nm and about 20 nm.

In an embodiment, the silica particles have an average diameter of less than or equal to about 30 nm. In another embodiment, the silica particles may have an average diameter of less than or equal to about 25 nm. In another embodiment, the silica particles may have an average diameter of less than or equal to about 20 nm. In another embodiment, the silica particles may have an average diameter of less than or equal to about 15 nm. In another embodiment, the silica particles may have an average diameter of less than or equal to about 10 nm. In another embodiment, the silica particles may have an average diameter of less than or equal to about 7 nm. In another embodiment, the silica particles may have an average diameter of at least about 5 nm. In another embodiment, the silica particles may have an average diameter of at least about 7 nm. In another embodiment, the silica particles may have an average diameter of at least about 10 nm. In another embodiment, the silica particles may have an average diameter of at least about 15 nm. In another embodiment, the silica particles may have an average diameter of at least about 20 nm. In another embodiment, the silica particles may have an average diameter of at least about 25 nm. Combinations of the above-referenced ranges are also possible.

Colloidal silica is a flexible technology medium, allowing for customized surface treatment based on application. In an embodiment, the silica is a GlycidoxyPropylTriMethoxySilane-functional silica. GPTMS-functionalized silica includes alkaline sol silica, available from Nissan Chemical America as ST-V3. Another GPTMS-functionalized silica is an acidic type of silica sol, available from Nissan Chemical America as ST-OV3.

The amount of silica nanoparticle used per unit of H2S is as follows:

In an embodiment, 1 unit of silica nanoparticle per 3 units of H2S, in another embodiment, 1 unit of silica nanoparticle per 5 units of H2S and in another embodiment, 1 unit of silica nanoparticle per 10 units of H2S.

The alumina nanoparticles are sourced from all forms of precipitated $Al_2O_3$ a) dry alumina;

b) fumed alumina;

c) colloidal alumina;

d) surface treated aluminas including aluminas reacted with organosilanes;

e) metal or metal-oxide with alumina combinations; and f) precipitated alumina.

There are known ways to modify the surface of colloidal alumina:

1. Covalent attachment of Inorganic oxides other than alumina.

2. Non-covalent attachment of small molecule, oligomeric, or polymeric organic materials (PEG treatment, amines or polyamines, sulfides, etc.).

3. Covalent attachment of organic molecule including oligomeric and polymeric species:

a. Reaction with organosilanes/titanates/zirconates/germinates.

b. Formation of organosilanes/titanate/zirconate/germinate oligomers followed by reaction of these with surface of colloidal alumina.

c. Silanization followed by post-reaction formation of oligomeric/dendritic/hyperbranched/polymeric species starting from colloidal alumina surface.

d. Formation of oligomeric/dendritic/hyperbranched/polymeric silanes/zirconates/titanates followed by reaction to $Al_2O_3$ surface.

The alumina particles included in the colloidal alumina may have any suitable average diameter. As used herein, the average diameter of alumina particles refers to the average largest cross-sectional dimension of the alumina particle. In an embodiment, the alumina particles may have an average diameter of between about 0.1 nm and about 100 nm. In another embodiment, the alumina particles may have an average diameter of between about 1 nm and about 100 nm. In another embodiment, the alumina particles may have an average diameter of between about 5 nm and about 100 nm. In another embodiment, the alumina particles may have an average diameter of between about 1 nm and about 50 nm. In another embodiment, the alumina particles may have an average diameter of between about 5 nm and about 50 nm. In another embodiment, the alumina particles may have an average diameter of between about 1 nm and about 40 nm. In another embodiment, the alumina particles may have an average diameter of between about 5 nm and about 40 nm. In another embodiment, the alumina particles may have an average diameter of between about 1 nm and about 30 nm. In another embodiment, the alumina particles may have an average diameter of between about 5 nm and about 30 nm. In another embodiment, the alumina particles may have an average diameter of between about 7 nm and about 20 nm.

In an embodiment, the alumina particles have an average diameter of less than or equal to about 30 nm. In an embodiment, the alumina particles have an average diameter of less than or equal to about 25 nm. In an embodiment, the alumina particles have an average diameter of less than or equal to about 20 nm. In an embodiment, the alumina particles have an average diameter of less than or equal to about 15 nm. In an embodiment, the alumina particles have an average diameter of less than or equal to about 10 nm. In an embodiment, the alumina particles have an average diameter of less than or equal to about 7 nm. In an embodiment, the alumina particles have an average diameter of at least about 5 nm. In an embodiment, the alumina particles have an average diameter of at least about 7 nm. In an embodiment, the alumina particles have an average diameter of at least about 10 nm. In an embodiment, the alumina particles have an average diameter of at least about 15 nm. In an embodiment, the alumina particles have an average diameter of at least about 20 nm. In an embodiment, the alumina particles have an average diameter of at least about 25 nm. Combinations of the above-referenced ranges are also possible.

Colloidal alumina is a flexible technology medium, allowing for customized surface treatment based on application. In an embodiment, the alumina is a GPTMS-functional alumina. GlycidoxyPropylTriMethoxySilane-functional alumina includes alkaline sol silica, available from Nissan Chemical America as AT-V6. Another GPTMS-functionalized alumina is an acidic type of silica sol, available from Nissan Chemical America as AT-OV6.

The amount of alumina nanoparticle used per unit of H2S is as follows:

1 unit of alumina nanoparticle per 3 units of H2S, in another embodiment, 1 unit of alumina nanoparticle per 5 units of H2S and in another embodiment, 1 unit of alumina nanoparticle per 10 units of H2S.

Some examples of nanoparticles can include particles of spherical shape, fused particles such as fused silica or alumina or particles grown in an autoclave to form a raspberry style morphology, or elongated silica particles. The particles being bare, or surface treated. When surface treated may be polar or non-polar.

The surface treatment is sufficient to allow the nanoparticle to be stable during transportation to the area where a $H_2S$ sorbent is required and for delivery. The stability achieved either by covalent, charge-charge, dipole-dipole, or charge-dipole interactions.

Triazines useful in the instant claimed invention include, but are not limited to, 1,2,3-triazine; 1,2,4-triazine and 1,3,5-triazine (aka s-triazine).

Triazines are alkaline and can cause carbonate scaling. Triazines are commercially available.

Triazines can be present in the process at a level of from about zero point 1 (0.1) units to about 1 unit per 3 units of $H_2S$. Units could mean any quantitative measure, such as grams, pounds, mols, etc. etc.

$CO_2$ Point Source Purification is described in "Evaluation of $CO_2$ Purification Requirements and the Selection of Processes for Impurities Deep Removal from the $CO_2$ Product Stream", Zeina Abbas et al, Energy Procedia, Volume 37, 2013, Pages 2389-2396. Depending on the reference power plant, the type of fuel and the capture method used, the $CO_2$ product stream contains several impurities which may have a negative impact on pipeline transportation, geological storage and/or Enhanced Oil Recovery (EOR) applications. All negative impacts require setting stringent quality standards for each application and purifying the $CO_2$ stream prior to exposing it to any of these applications.

In the Abbas paper, the $CO_2$ stream specifications and impurities from the conventional post-combustion capture technology are assessed. Furthermore, the $CO_2$ restricted purification requirements for pipeline transportation, EOR and geological storage are evaluated. Upon the comparison of the levels of impurities present in the $CO_2$ stream and their restricted targets, it was found that the two major impurities which entail deep removal, due to operational concerns, are oxygen and water from 300 ppmv to 10 ppmv and 7.3% to 50 ppmv respectively. Moreover, a list of plausible technologies for oxygen and water removal is explored after which the selection of the most promising technologies is made. It was found that catalytic oxidation of hydrogen and refrigeration and condensation are the most promising technologies for oxygen and water removal respectively.

"Geothermal Energy System Streams" are described as follows:

Hot water is pumped from deep underground through a well under high pressure.

When the water reaches the surface, the pressure is dropped, which causes the water to turn into steam.

The steam spins a turbine, which is connected to a generator that produces electricity.

The steam cools off in a cooling tower and condenses back to water.

EXAMPLES

Materials

Stepanquat 200 is a 78.5% actives solution of Hexahydro-1,3,5-tris(hydroxyethyl)-s-triazine available commercially from Stepan Corp.

ST-O40, ST-30, ST-OV4, PGM-ST, ST-C, ST-V3, and MT-ST are commercially available colloidal silica products from Nissan Chemical America Corporation.

Organosilanes, Propylene Glycol Monomethyl Ether solvent, $NaHCO_3$, $CuCl_2$—$H_2O$, and Glyoxal were procured from Sigma Aldrich Corp.

Synthesis Example 1

1000 mL Snowtex® ST-30 from Nissan Chemical America Corporation (Aqueous alkaline colloidal silica dispersion, 30 wt % $SiO_2$ solids, 10-15 median particle size) was placed into a 2000 mL 4 neck glass reactor assembled with addition funnel, thermometer, heating mantle connected to voltage regulator, and mixer with 2 inch diameter trifoil mixing blade. Mixing was activated at 150 rpm and silicasol was brought to 50° C. Into the addition funnel was weighed 49.98 g of Aminoethylaminoethylaminopropyl Trimethoxysilane (CAS #35141-30-1, Sigma-Aldrich). Addition funnel was assembled to reactor top and silane was slowly added to stirring silicasol at a drop rate of 2 drops per second. After all organosilane had been added to reaction the mixture was allowed to stir at 50° C. for a period of 3 hours. Finished surface-treated alkaline silica was poured off to a 2 L Nalgene bottle for storage and use.

Synthesis Example 2

1.4 L Snowtex® O-XS (Aqueous acidic colloidal silica dispersion, 10 wt % colloidal silica median particle size 5 nm) was transferred to a 4-neck reaction kettle. To this vessel were also added 9.6 L distilled water. Copper (II) Chloride dehydrate ($CuCl_2$—$H_2O$, Sigma Aldrich), 13.87 g were added to the reaction flask and allowed to dissolve at room temperature under light agitation. A stock solution ("Solution A") of $NaHCO_3$(Sigma Aldrich ACS reagent grade, ≥99.7% was prepared (47.04 g $NaHCO_3$ dissolved in 12.6 L distilled water, 0.04 M final concentration). The stir rate in the reaction vessel was increased to 9500 rpm to achieve vigorous agitation. Solution A was added slowly 10-15 mL per minute to the reaction via addition funnel. After Solution A was added completely the reaction was allowed to stir at room temperature for 30 minutes and contents were removed for storage and use.

Synthesis Example 3

Snowtex® PGM-ST (Solvent borne dispersion of acidic colloidal silica, 30 wt % SiO2 median particle size 10-15 nm dispersed in Propylene Glycol Monomethyl ether), 450 g were placed into a 1000 mL 4-neck reaction flask. Similar to Synthesis Example 1 the reactor was assembled with mixer, thermometer, and heating mantle/voltage regulator. A 4.05 g portion of 3-Mercaptopropyl Trimethoxysilane (Sigma Aldrich) were added to an addition funnel and assembled to the reactor. PGM-ST was brought to 50° C. under mild agitation and Mercaptopropyl trimethoxysilane was added dropwise via addition funnel at 1 drop/second until addition was complete. Reaction was kept at 50° C. for a period of 3 hours, then the surface-treated silicasol was poured off to a Nalgene container for storage and use.

Example 1, Comparative

Into a 1000 mL Nalgene bottle were placed 300 g distilled $H_2O$, 300 g Propylene Glycol Monomethyl Ether ("PGM") solvent, and 300 g Stepanquat 200. Contents were mixed thoroughly by shaking container vigorously for 30 seconds.

Example 2

Into a 1000 mL Nalgene bottle were placed 300 g distilled $H_2O$, 300 g Propylene Glycol Monomethyl Ether solvent, and 300 g Synthesis Example 1 fluid. Contents were mixed thoroughly by shaking container vigorously for 30 seconds.

Example 3, Comparative

Into a 1000 mL Nalgene bottle were placed 700 g distilled $H_2O$, and 300 g Stepanquat 200. Contents were mixed thoroughly by shaking container vigorously for 30 seconds.

Example 4

Into a 1000 mL Nalgene bottle were placed 300 g distilled $H_2O$, 300 g ST-O40 (Aqueous acidic colloidal silica available from Nissan Chemical America Corporation), and 300 g Stepanquat 200. Contents were mixed thoroughly by shaking container vigorously for 30 seconds.

Example 5

Into a 1000 mL Nalgene bottle were placed 300 g distilled $H_2O$, 300 g Synthesis Example 2 fluid, and 300 g Stepanquat 200. Contents were mixed thoroughly by shaking container vigorously for 30 seconds.

Example 6

Into a 1000 mL Nalgene bottle were placed 300 g distilled $H_2O$, 300 g ST-OV4 (Aqueous acidic hydrophilic surface treated colloidal silica available from Nissan Chemical America Corporation), and 300 g Stepanquat 200. Contents were mixed thoroughly by shaking container vigorously for 30 seconds.

Example 7

Into a 1000 mL Nalgene bottle were placed 300 g distilled $H_2O$, 300 g Synthesis Example 3 fluid, and 300 g Stepanquat 200. Contents were mixed thoroughly by shaking container vigorously for 30 seconds.

Example 8

Into a 1000 mL Nalgene bottle were placed 375 g aqueous solution of Glyoxal (Sigma Aldrich, 37.5 wt %) and 625 g ST-C (Aqueous alkaline colloidal silica dispersion partially surface treated with Aluminum Oxide available from Nissan Chemical America Corporation). Contents were mixed thoroughly by shaking container vigorously for 30 seconds.

Example 9

Into a 1000 mL Nalgene bottle were placed 375 g aqueous solution of Glyoxal (Sigma Aldrich, 37.5 wt %) and 625 g ST-O40 (Aqueous acidic colloidal silica dispersion available from Nissan Chemical America Corporation). Contents were mixed thoroughly by shaking container vigorously for 30 seconds.

Example 10

Into a 1000 mL Nalgene bottle were placed 375 g aqueous solution of Glyoxal (Sigma Aldrich, 37.5 wt %) and 625 g ST-V3 (Aqueous alkaline hydrophilic surface treated colloidal silica dispersion available from Nissan Chemical America Corporation). Contents were mixed thoroughly by shaking container vigorously for 30 seconds.

Example 11

Into a 1000 mL Nalgene bottle were placed 375 g aqueous solution of Glyoxal (Sigma Aldrich, 37.5 wt %) and 625 g MT-ST (Solvent borne acidic colloidal silica dispersed in Methanol, 30 wt % $SiO2$, 10-15 nm median particle size, available from Nissan Chemical America Corporation). Contents were mixed thoroughly by shaking container vigorously for 30 seconds.

Example 12: Comparative

Into a 1000 mL Nalgene bottle were placed 375 g aqueous solution of Glyoxal (Sigma Aldrich, 37.5 wt %) and 625 g distilled $H_2O$. Contents were mixed thoroughly by shaking container vigorously for 30 seconds.

MEA Triazine was kept at a constant concentration across all the Inventive and Comparative examples. Similarly, Glyoxal concentration was kept constant across all Inventive and Comparative examples.

Testing for Removal of H2S

Each solution tested was equilibrated for weight at 300 g total solution and placed into a vessel with overhead port to measure $H_2S$ content in the vessel headspace. The headspace port was connected to a Dräger Pac® 3500 gas monitor (Drägerwerk AG&Co. KGaA). A mixed gas of 10% $H_2S$/ 90% Nitrogen was bubbled through the test solution at a standard rate of 475 mL/minute, solution held at 22° C., and headspace monitored for $H_2S$ content. A reading of 0 means the sensor is not detecting any $H_2S$ in the flow gas stream after the gas has passed through the tested solution. Vessel headspace was monitored for $H_2S$ content once per minute continuously until a $H_2S$ content of 40 reading on gas monitor was reached, at which point the test example in solution reacting with $H_2S$ was considered to be consumed and the experiment stopped. Times to initial $H_2S$ reading and Time to complete $H_2S$ breakthrough were recorded and compared to controls/comparative examples.

Summary of Results

The Number of minutes is listed is how long the detector detected a value of "0" for $H_2S$. The Table is ordered from best performance in terms of removal of H2S to worst performance.

| Example | Time to initial H2S reading (minutes) | Time to 40% H2S reading (minutes) | Composition | nanoparticle type |
|---|---|---|---|---|
| 2 | 124 | 160 | Triazine + Water + Amine func. SiO2 | Amine-Functional SiO2 |
| 1 | 117 | 145 | Triazine + Water + PGMsolvent (Comparative Example) | none |
| 8 | 107 | 184 | Glyoxal + ST-C | Aluminum oxide functional SiO2 |
| 4 | 71 | 164 | Triazine + Water + ST-O40 | Aqueous acidic SiO2 |
| 10 | 55 | 146 | Glyoxal + ST-V3 | Glycidoxy functional SiO2, alkaline |
| 5 | 55 | 139 | Triazine + Water + CuOXS | Transition Metal functional SiO2 |
| 7 | 55 | 105 | Triazine + Water + Mercapto functionalized PGM-ST | Mercapto Functional SiO2 |
| 9 | 51 | 86 | Glyoxal + ST-O40 | Aqueous acidic SiO2 |
| 3 | 44 | 61 | Triazine + Water (Comparative Example) | none |
| 6 | 39 | 153 | Triazine + Water + ST-OV4 | Glycidoxy functional SiO2, acidic |
| 12 | 8 | 14 | Glyoxal + Water (Comparative Example) | none |
| 11 | 1 | 2 | Glyoxal + MT-ST | Solventborne SiO2, acidic |

Observations about the Examples

1. Example 1: This is a Triazine controls/comparative examples with MEA Triazine dissolved in a mixture of water and PGM solvent. This example performed very well, much better than MEA Triazine alone at the same concentration dissolved in water. It is believed, without intending to be bound there bye, that it is possible PGM is actually very beneficial in Triazine+H2S reaction.

2. Example 2 (Amine-functional SiO2 combined with Triazine) performed very well compared to the comparative example, with improved/delayed time to initial H2S breakthrough and also time to final breakthrough (when the H2S readings reached a 40% level in the headspace above the sample).

3. Example 3 is the Triazine+water control, these times were used comparatively for all the Triazine+nanosilica examples. Example 3 exemplifies the standard field grade fluid of MEA Triazine fluid for treatment of sour gas.

4. Example 4 (ST-O40, Aqueous acidic silica+Triazine) performed the best of all Triazine+nanosilica examples. It is believed, without intending to be bound thereby, that the solid acidity of the acidic silica surface is likely acting as a catalyst to make the Triazine+H2S reaction more complete, leading to greatly improved/delayed time to initial and complete H2S breakthrough.

5. Example 5 (Copper functionalized nanosilica+Triazine) performed relatively well in improved/delayed time to initial and complete H2S breakthrough. This example is the only example of Transition Metal functional silica. (It is noted that the Aluminum present in Example 8 is not considered a true Transition metal, as it is a "Post Transition Metal".)

6. Example 6 (ST-OV4+Triazine) is aqueous acidic silica functionalized with hydrophilic organic surface treatment and is commercially available from Nissan Chemical America. This example had slightly worse time to H2S initial breakthrough, but had a greatly improved time to complete H2S breakthrough compared to the control (Example 3).

7. Example 7 (Mercapto-functional nanosilica dispersed in PGM+Triazine)—Slightly improved time to initial H2S breakthrough and much improved time to complete H2S breakthrough. It is believed, without intending to be bound thereby, that the Mercapto surface functionality can disrupt polymer formation in the Triazine+H2S reaction.

8. Example 8 is ST-C (Aqueous alkaline colloidal silica with Aluminum Oxide surface) combined with Glyoxal. Compared to Glyoxal alone this combination of ST-C+Glyoxal showed dramatic improvements in both time to initial and time to complete H2S breakthrough. The Glyoxal+nanosilica examples performed relatively well. It is noted that the Aluminum present in Ex. 8 is not considered a true Transition metal, as it is a "Post Transition Metal".

9. Example 9 (ST-O40+Glyoxal) performed much better than Glyoxal alone.

10. Example 10 (ST-V3, Aqueous alkaline silica with hydrophilic organic surface treatment+Glyoxal) performed very well compared to Glyoxal alone.

11. Example 11 (Acidic silica dispersed in Methanol) did not perform well, this example had the worst results of all. It is believed, without intending to be bound thereby that MT-ST completely deactivated Glyoxal from reacting with H2SJ 12. Example 12 is the solution of Glyoxal and water only, a comparative example with no added nanotechnology.

The invention claimed is:

1. A process to remove $H_2S$ from a stream comprising the step of:
   adding a fluid comprising
   (i) a melamine cyanurate,
   (ii) a silica nanoparticle composition, and
   (iii) a triazine, to the stream, wherein the stream is selected from the group consisting of Oil streams, Gas streams, $CO_2$ point source purification streams, and Geothermal Energy System streams.

\* \* \* \* \*